(12) United States Patent
Wu et al.

(10) Patent No.: US 8,107,969 B2
(45) Date of Patent: Jan. 31, 2012

(54) METHOD AND SYSTEM OF CHANNEL NEGOTIATION BETWEEN NEIGHBOR BASE STATIONS

(75) Inventors: Xuyong Wu, Shenzhen (CN); Zhong Pan, Shenzhen (CN); Quanbo Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 703 days.

(21) Appl. No.: 12/169,941

(22) Filed: Jul. 9, 2008

(65) Prior Publication Data

US 2008/0268858 A1    Oct. 30, 2008

Related U.S. Application Data

(63) Continuation of application No. PCT/CN2007/000092, filed on Jan. 10, 2007.

(30) Foreign Application Priority Data

Jan. 10, 2006 (CN) .......................... 2006 1 0032929

(51) Int. Cl.
H04W 72/00 (2009.01)
H04W 4/00 (2009.01)
H04B 7/212 (2006.01)

(52) U.S. Cl. ................. 455/451; 455/452.1; 370/329; 370/348

(58) Field of Classification Search .......... 455/450, 455/451, 452.1, 447, 448, 452.2, 453; 370/329, 370/330, 346, 347, 348
See application file for complete search history.

(56) References Cited

U.S. PATENT DOCUMENTS

| | | | | |
|---|---|---|---|---|
| 3,898,390 A | * | 8/1975 | Wells et al. | 455/438 |
| 5,305,371 A | * | 4/1994 | Saegusa et al. | 455/462 |
| 5,471,671 A | * | 11/1995 | Wang et al. | 455/226.2 |
| 6,212,389 B1 | * | 4/2001 | Fapojuwo | 455/453 |
| 6,216,004 B1 | * | 4/2001 | Tiedemann et al. | 455/442 |

(Continued)

FOREIGN PATENT DOCUMENTS

CA    2 432 433 A1    12/2003

OTHER PUBLICATIONS

Written Opinion of the International Searching Authority in corresponding PCT Application No. PCT/CN2007/000092 (May 17, 2007).

(Continued)

*Primary Examiner* — Christopher M Brandt
(74) *Attorney, Agent, or Firm* — Leydig, Voit & Mayer, Ltd.

(57) ABSTRACT

A method and system of channel negotiation between neighbor BSs are provided. The method includes: a first BS obtaining channel information of all second BSs which neighboring to the first BS in response to starting of the first BS; selecting a channel in the network as a first working channel of the first BS, and requesting all third BSs which are the second BSs occupying the first working channel to switch channel; and determining another channel for each of the third BSs excluding the first working channel as the target channel of the third BS, and switching the working channel of the third BS to the target channel, then occupying the first working channel. The method and system of channel negotiation between neighbor BSs adjust channels between neighbor BSs by negotiation automatically, and resource distribution for the whole network is optimized.

18 Claims, 3 Drawing Sheets

U.S. PATENT DOCUMENTS

| | | |
|---|---|---|
| 6,507,740 B2 | 1/2003 | Shi |
| 6,563,839 B1 * | 5/2003 | Hallenstal et al. ............ 370/437 |
| 6,580,913 B1 * | 6/2003 | Chao et al. ................. 455/452.1 |
| 6,788,659 B1 * | 9/2004 | Sato ............................ 370/329 |
| 6,898,431 B1 * | 5/2005 | Peele ........................... 455/453 |
| 7,043,242 B2 | 5/2006 | Kuiri et al. |
| 7,174,170 B2 * | 2/2007 | Steer et al. .................... 455/446 |
| RE40,540 E * | 10/2008 | Sainton et al. ............. 455/422.1 |
| 7,535,831 B2 * | 5/2009 | Phelps et al. ................. 370/228 |
| 2002/0090965 A1 * | 7/2002 | Chen et al. .................. 455/522 |
| 2002/0102941 A1 | 8/2002 | Kuiri et al. |
| 2002/0102977 A1 | 8/2002 | Shi |
| 2002/0126635 A1 * | 9/2002 | Sugiyama et al. ........... 370/329 |
| 2002/0188723 A1 * | 12/2002 | Choi et al. .................... 709/225 |
| 2004/0141478 A1 * | 7/2004 | Kasapi et al. ................ 370/329 |
| 2004/0203733 A1 | 10/2004 | Collum et al. |
| 2006/0019670 A1 * | 1/2006 | Joung et al. .................... 455/450 |
| 2006/0109815 A1 * | 5/2006 | Ozer et al. ..................... 370/329 |
| 2006/0116077 A1 * | 6/2006 | Liu et al. ......................... 455/42 |

OTHER PUBLICATIONS

"IEEE Std 802.16™-2004 - Part 16: Air Interface for Fixed Broadband Wireless Access Systems," IEEE Standard for Local and metropolitan area networks, Oct. 1, 2004, Institute of Electrical and Electronic Engineers, New York, New York.

"IEEE 802.16h-05/014—Call for Contributions," IEEE 802.16's License-Exempt (LE) Task Group, Jun. 9, 2005, Institute of Electrical and Electronic Engineers, Geneva Switzerland.

* cited by examiner

METHOD AND SYSTEM OF CHANNEL NEGOTIATION BETWEEN NEIGHBOR BASE STATIONS

CROSS-REFERENCE TO RELATED APPLICATIONS

This application is a continuation of International Patent Application No. PCT/CN2007/000092, filed Jan. 10, 2007, which claims priority to Chinese Patent Application No. 200610032929.8, filed on Jan. 10, 2006, entitled "METHOD AND SYSTEM OF CHANNEL NEGOTIATION BETWEEN NEIGHBOR BASE STATIONS," both of which are hereby incorporated by reference in their entirety.

FIELD OF THE INVENTION

The present invention relates to use of channels in a broadband wireless access technology, and more particularly to a method and system of channel negotiation between neighbor base stations (BSs).

BACKGROUND

The broadband wireless access technology refers to broadband access using radio resources, and channels are critical to the broadband wireless access technology. In the present application, the channel is a general terminology, which refers to a communication system resource such as a physical frequency band or a virtual link resource. For example, a time division multiplex band may generate multiple virtual channels, and different CDMA code words correspond to different CDMA channels.

For a base station (BS), the neighbor BSs of the BS are BSs that share a common coverage area with the BS, and in the common coverage area there are one or more effective terminals. For example, for a BS A, a BS B is a neighbor BS. Then, for the BS B, the BS A is also a neighbor BS. In other words, a neighborhood relationship exists between the BS A and B.

All the BSs in the network share limited resources, no BSs can occupy the resources in the network freely without any constraints, and the resources shall be allocated by plan or negotiation. As for a network section without feasible channel plan or using the license-exempt band (LE band) in the network, a problem will arise that multiple BSs occupy the same channel simultaneously, and therefore interference between the BSs is inevitable. For a large scale network, the channel negotiation between the neighbor BSs is critical to the utilization efficiency of the resources, and therefore the performance of the BSs and the network is affected. Various methods of channel negotiation between the neighbor BSs in the prior art are listed as follow.

Method 1: A network planning is performed to allocate channels statically for the BSs so as to ensure that the BSs in the common coverage area occupy different channels. However, the method does not support a dynamic allocation. When the topology of the network changes, the allocation needs to be re-planned, so this method has a low efficiency.

Method 2: A group of BSs having the neighborhood relationship are defined as one community, and the channels are allocated to each BS in the community through a particular algorithm, such as greedy algorithm so as to ensure an optimal performance by using the minimum number of channels. The method may be implemented in two ways, namely, a centralized mode and a distributed mode. In the centralized mode, a BS is designated to perform channel distribution computation, and then the other BSs are ordered to switch to a target channel according to the computation result. In the distributed mode, all the BSs in the community compute the target channels of the BSs simultaneously when being informed of the topology change of the network, and each of the BSs performs the switch at the same time after computing the target channel of the BS.

When new BSs join in the community, distribution computation needs to be performed in the whole community again, and most of the BSs in the community will switch channel. The above process increases terminal cost, and is conflict with current protocols.

SUMMARY

The present invention mainly provides a method of channel negotiation between neighbor base stations (BSs). When a new BS joins in the network, the working channels of the neighbor BSs of the new BS are adjusted through information exchange between the new BS and the neighbor BSs of the new BS so as to provide an available working channel for the new BS.

The present invention also provides a system of channel negotiation between neighbor BSs. When a new BS joins in the system, the working channels of the neighbor BSs are adjusted automatically so as to provide an available working channel for the new BS.

In order to achieve the above objectives, a technical scheme of the present invention is specifically achieved as follows:

A method of channel negotiation between neighbor BSs includes:

A first BS obtains channel information of all second BSs which are the neighbor BSs to the first BS in response to the first BS starts.

A channel in the network is selected as a first working channel of the first BS, and all third BSs are requested to switch channel, wherein the third BSs refer to BSs which occupy the first working channel in all the second BSs.

Another channel excluding the first working channel is determined for each of the third BSs as a target channel of the third BS, and each of the third BSs switches a working channel of the third BS to the target channel, then the first BS occupies the first working channel.

A system of channel negotiation between neighbor BSs includes a first BS and at least one second BS neighboring to the first BS.

The first BS is adapted to obtain channel information of all the second BSs which are the neighbor BSs to the first BS, selects a channel in the network as the first working channel of the first BS when starting, request all third BSs to switch channel, and occupy the first working channel.

Each of the third BSs is adapted to switch to the target channel in response to determining another channel as the target channel of the third BS, wherein the third BSs refer to BSs which occupy the first working channel in all the second BSs.

According to the above technical scheme, channels adjustment between the neighbor BSs is performed through automatic negotiation, and resource distribution for the whole network is optimized. Therefore, the limited communication resources may support as many BSs as possible. Moreover, the above process is dynamic, and the channel adjustment is performed only between the neighbor BSs, which improves channel negotiation efficiency between the BSs.

BRIEF DESCRIPTION OF THE DRAWING(S)

DETAILED DESCRIPTION

Figure 1:
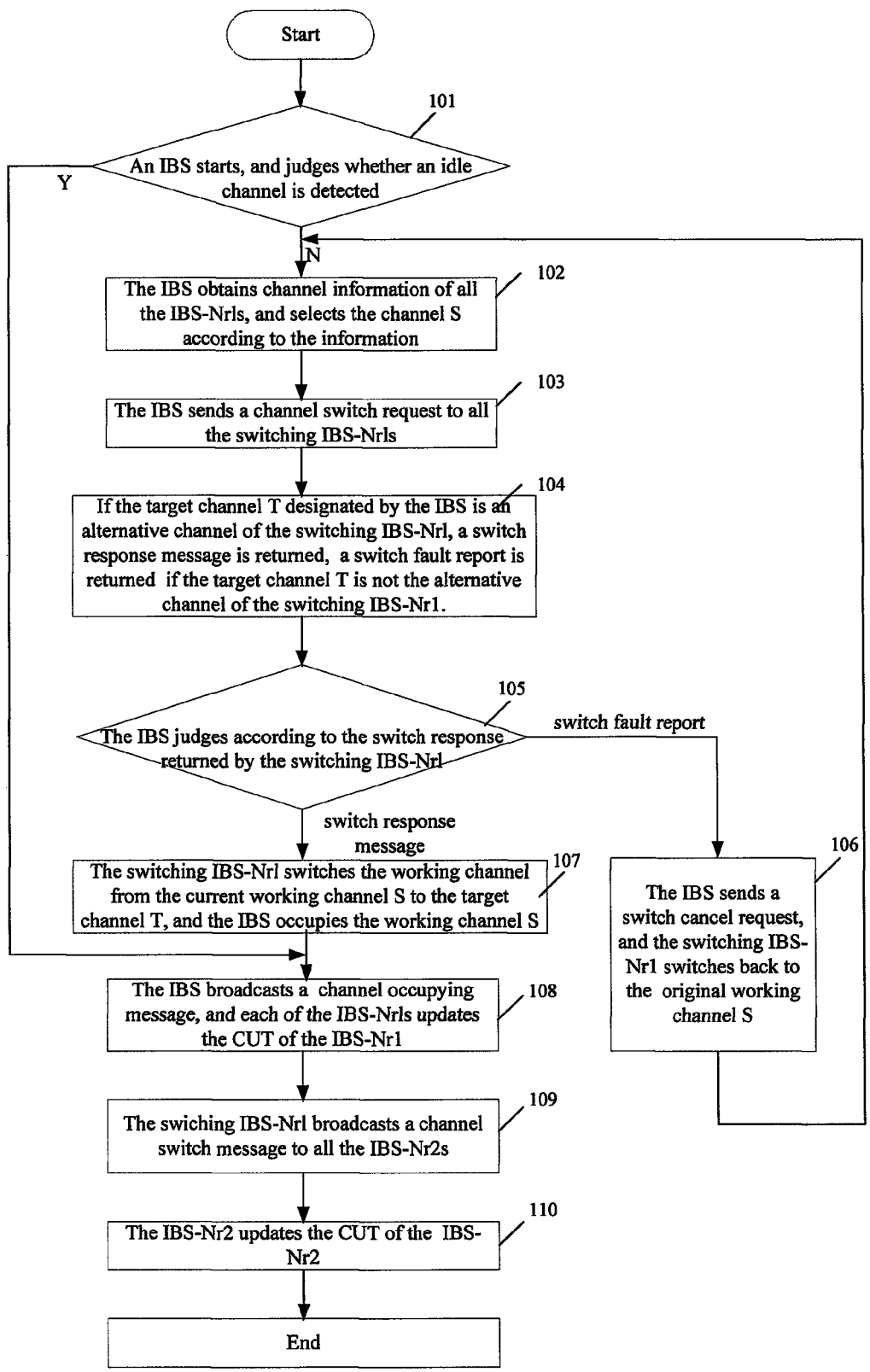
FIG. 1 is a flow chart illustrating negotiation of a working channel S for an IBS according to an embodiment of the present invention.

The following concepts are adopted in the illustration of the method and system of embodiments of the present invention.

A working channel is a channel occupied currently by a BS. The BS works normally at the channel and has no interfere with any of neighbor BSs of the BS.

An alternative channel is a reserved channel for a BS, on which the BS works does not cause any interference with any of the neighbor BSs of the BS. When the working channel is unavailable, the BS may switch to any one of the alternative channels of the BS to avoid interfering with the neighbor BSs of the BS and work normally. In other words, for a BS, the alternative channel is a channel unoccupied by any of the neighbor BSs of the BS. Generally speaking, the BS has one or more alternative channels, and information of the alternative channels is recorded in an alternative channel list. The BS obtains the alternative channels of the BS by excluding the working channels of each of the neighbor BSs of the BS from the channels already known in a scanned area. Definitely, the working channel of the BS shall not be recorded in the alternative channel list.

A target channel refers to a channel selected from the alternative channel list. When the working channel is unavailable any more, the BS switches the working channel of the BS to the target channel.

A channel usage table (CUT) is a table recording all the BSs' channel information such as the working channels of all the BSs and the alternative channels of all the BSs. As an example, the CUT of a BS is shown in Table 1.

TABLE 1

| BSID | Working Channel | Alternative Channel List |
|---|---|---|
| Local BSID | Channel ID 0 | Alternative Channel ID List 0 |
| Neighbor 1 BSID | Channel ID 1 | Alternative Channel ID List 1 |
| . | . | . |
| . | . | . |
| . | . | . |
| Neighbor n BSID | Channel ID n | Alternative Channel ID List n |

In Table 1, the working channel list and the alternative channel list of the local BS are recorded in the first row, and the working channel lists and the alternative channel lists of each of the neighbor BSs are recorded in the following rows.

In the CUT, the alternative channel list of the local BS records the remaining channels excluding the working channels of the neighbor BSs of the local BS and the working channel of the local BS. The CUT needs to be updated in time.

In addition, the local BS needs to update the information about the working channel of each of the neighbor BSs in time. In other words, once the working channel of any neighbor BS is changed, the local BS has to modify corresponding records in the CUT of the local BS. The alternative channel lists of the neighbor BSs in the CUT are obtained from corresponding neighbor BSs through information exchange, and the local BS does not have to maintain the alternative channel lists of each of the neighbor BSs.

When the topology of the network or the working channel of the BS is changed, the BS should update the working channel list of each of the neighbor BSs in time, and update the alternative channel list of the BS accordingly. When being unable to find any idle channel, the BS may perform a distribution computation again according to the alternative channel list of the BS. In the above process, the BS may designate the target channel for the neighbor BSs, or the neighbor BSs select an alternative channel as the target channel automatically. As for the latter case, the BS only needs to obtain whether each of the neighbor BSs has the alternative channel instead of obtaining the whole alternative channel list of each of the neighbor BSs.

The change in the topology of the network means the change of the BSs in the network or a change of the neighborhood relationships between the BSs. The change of the BSs includes a BS joins in/exits from the network or networks merges/decomposes. The change of the neighborhood relationships between the BSs means the increase/decrease of the neighborhood relationships between the BSs.

In an embodiment of the present invention, when a new BS joins in the network, the channel negotiation between neighbor BSs is performed to allocate a working channel S to the new BS. As shown in FIG. 1, the method includes the following steps.

Step 101: A new BS starts when joining in a network. In the description below, the new BS is referred to as an initializing BS (IBS). Then, all first BSs neighbor to the IBS (IBS-Nr1s) are determined, and the IBS scans all available channels. The IBS directly occupies an idle channel as the working channel S of the IBS if the idle channel is detected, and step 108 is performed; step 102 is performed if no idle channel is detected.

In the step, the neighbor BSs of the IBS can be determined by various means such as coexistence signal interval (CSI) broadcasting, and this process is in the prior art and not described in detail here.

Step 102: The IBS obtains channel information of all the IBS-Nr1s, and selects the working channel S according to the channel information.

In the step, the method for the IBS to obtain channel information of all the IBS-Nr1s is that the IBS sends a channel query message to all the IBS-Nr1s, and then each of the IBS-Nr1s returns channel information of the IBS-Nr1. Or, each of the IBS-Nr1s broadcasts channel information of the IBS-Nr1 to the IBS after knowing that an IBS in the community starts through scanning. The channel information of the IBS-Nr1 includes the working channel list of the IBS-Nr1 and the alternative channel list of the IBS-Nr1, and the channel information may be recorded in any format such as a table.

Generally speaking, a channel in the network which will be determined as the working channel S of the IBS needs to meet the requirement that each of the IBS-Nr1s whose current working channel is the working channel S shall have one or more alternative channels. Thereby, when the IBS requires occupying the working channel S, each of the IBS-Nr1s selects one channel T as the target channel of the IBS-Nr1 from the alternative channel list of the IBS-Nr1, and switches the working channel of the IBS-Nr1 to the target channel T so as to leave the channel S for the IBS.

In an embodiment of the present invention, a method of selecting the working channel S is: IBS scans all the channels, determines the number of neighbor BSs working on each of the channel, i.e. how many IBS-Nr1s occupies a channel as the working channel, and determines whether each of the IBS-Nr1s which have the channel S as the working channel has at least one alternative channel.

The available channel is selected as the working channel S of the IBS if all IBS-Nr1s working on an available channel have at least one alternative channel and the number of IBS-Nr1s working on the available channel is the smallest. The available channel can not be determined as the working channel S if at least one of the IBS-Nr1s working on the available channel does not have any alternative channel. In the circumstance, another channel that the number of the IBS-NR1s works on the available channel is the next smallest will be considered via the similar method till the qualified working channel S is selected for the IBS.

In the embodiment, the IBS also selects an alternative channel for each of the IBS-Nr1s working on the working channel S as the target channel T of the IBS-Nr1 according to the CUT. In subsequent descriptions, the IBS-Nr1 working on the channel S is referred to as a switching IBS-Nr1.

Step 103: The IBS sends a channel switch request to all the switching IBS-Nr1s.

The channel switch request contains at least one of: an identifier of the IBS, an identifier of the switching IBS-Nr1, and an identifier of the target channel T.

Step 104: Each of the switching IBS-Nr1s judges whether the target channel T is the alternative channel of the switching IBS-Nr1; a switch response message is returned to the IBS if the target channel T is the alternative channel of the switching IBS-Nr1; a switch fault report indicating a channel negotiation failure is returned to the IBS if the target channel T is not the alternative channel of the switching IBS-Nr1.

Step 105: step 106 is performed if the IBS receives the switch fault report from at least one of the switching IBS-Nr1s; step 107 is performed if the IBS receives the switch response messages from all the switching IBS-Nr1s.

Step 106: The IBS sends a switch cancel request to all the switching IBS-Nr1s, and the switching IBS-Nr1s which have switched to the target channel shall switch back to the original working channel S to resume normal work after receiving the switch cancel request. Then, the IBS returns to perform the step 102.

When the IBS returns to the Step 102 to choose a new working channel, the channel S which has been selected before shall be excluded from the available channels list.

It should be noted that, the steps 104 to 106 are not indispensable steps, but exemplary ones in performing the method of the present invention, and are not indispensable.

Step 107: Each of the switching IBS-Nr1s switches the working channel from the current working channel S to the corresponding target channel T, and the IBS occupies the working channel S.

Step 108: The IBS broadcasts a channel occupying message to all the IBS-Nr1s so as to instruct all the IBS-Nr1s to update the channel information of all the IBS-Nr1s, and each of the IBS-Nr1s updates the CUT of the IBS-Nr1 according to the channel information.

Operations that each of the IBS-Nr1s updates the CUT specifically are: adding a row in the CUT of the IBS-Nr1 recording the channel information of the IBS, and deleting the working channel S from the alternative channel list of the IBS-Nr1. In addition, as each of the switching IBS-Nr1s has already switched to the target channel T to work, the IBS-Nr1 should further delete the target channel T from the alternative channel list of the IBS-Nr1.

Step 109: Each of the switching IBS-Nr1s broadcasts a channel switch message to all neighbor BSs of the switching IBS-Nr1, i.e. second neighbor BSs (IBS-Nr2s) excluding the IBS, to instruct all the IBS-Nr2s to update the CUTs of all the IBS-Nr2s.

Step 110: Each of the IBS-Nr2s updates the CUT of the IBS-Nr2, and the process ends.

Operations that each of the IBS-Nr2s updates the CUT specifically are: 1) deleting the target channel T from the alternative channel list of the IBS-Nr2; 2) setting the target channel T as the working channel of the switching IBS-Nr1 in the CUT; 3) judging whether each of the neighbor BS of the IBS-Nr2, i.e. IBS-Nr3s, occupying a channel S as the working channel of the IBS-Nr3, then judging whether the channel S can be added into the alternative channel list of the IBS-Nr2 accordingly; the channel S can be added into the alternative channel list of the IBS-Nr2 if no IBS-Nr3 occupies the channel S as the working channel of the IBS-Nr3.

Figure 2:
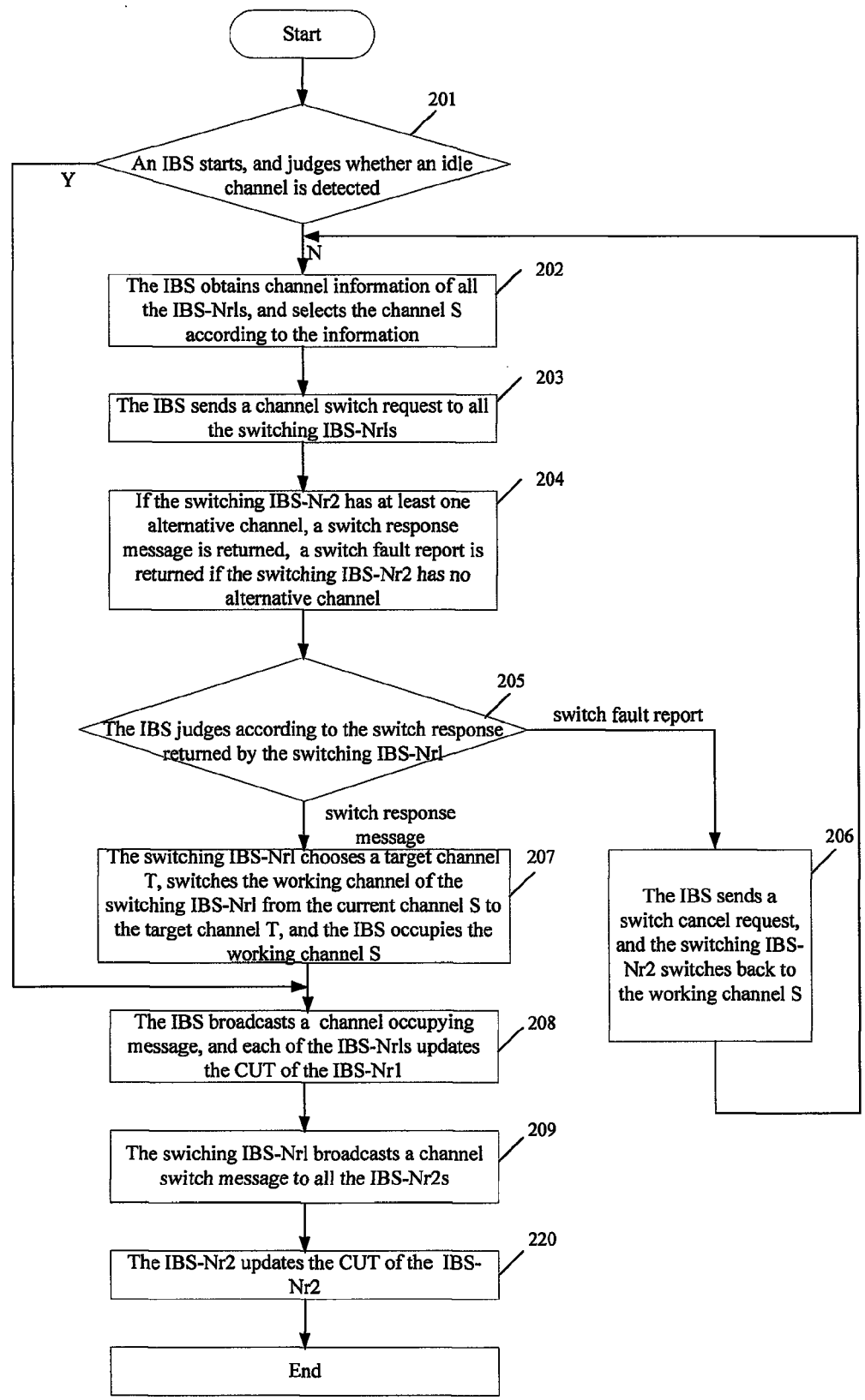
FIG. 2 is a flow chart illustrating negotiation of a working channel S for an IBS according to another embodiment of the present invention.

In another embodiment of the present invention, the method of negotiating a working channel S for an IBS between the neighbor BSs is shown in FIG. 2. Different from the embodiment shown in FIG. 1, in this embodiment, the target channel T may be selected by the switching IBS-Nr1 voluntarily instead of being designated by the IBS.

Step 201: When a new BS joins in the network, all first BSs neighboring to the IBS (IBS-Nr1s) are determined. IBS scans all the available channels. The IBS directly occupies the idle channel as the working channel S of the IBS if an idle channel is detected, and step 208 is performed; step 202 is performed if no idle channel is detected.

Step 202: The IBS obtains channel information of all the IBS-Nr1s, and selects the working channel S according to the channel information.

The channel information of the IBS-Nr1 includes the working channel of the IBS-Nr1, whether the alternative channel exists, and/or the number of the alternative channels.

Step 203: The IBS sends a channel switch request to all the IBS-Nr1s working on the channel S, i.e. the switching IBS-Nr1s.

The channel switch request contains an identifier of the IBS and/or an identifier of the switching IBS-Nr1.

Step 204: Each of the switching IBS-Nr1s judges whether it is possible to switch to another channel; the switching IBS-Nr1 returns a switch response message to the IBS if it is possible to switch to another channel; the switching IBS-Nr1 returns a switch fault report indicating a channel negotiation failure to the IBS if it is not possible to switch to another channel.

In the step, each of the switching IBS-Nr1s judges whether it is possible to switch channel according to the alternative channel list of the switching IBS-Nr1. The switching IBS-Nr1 switches channel if the switching IBS-Nr1 has at least one alternative channel. The switching IBS-Nr1 may select any alternative channel as the target channel T of the switching IBS-Nr1. The switching IBS-Nr1 cannot switch channel if no alternative channel exists in the alternative channel list.

Step 205: Step 206 is performed if the IBS receives the switch fault report from at least one of the switching IBS-Nr1s; step 207 is performed if the IBS receives the switch response messages from all the switching IBS-Nr1s.

Step 206: The IBS sends a switch cancel request to all the switching IBS-Nr1s, and those switching IBS-Nr1s which have switched to the target channel shall switch back to the original working channel S to resume normal work after receiving the switch cancel request, and the IBS returns to perform the step 202.

When the IBS returns to the step 202 to select a new working channel, the channel S, which has been selected before, shall be excluded from the available channels list.

It should be noted that, the steps 204 to 206 are not indispensable steps, but exemplary ones in performing the present invention, and are not indispensable.

Step 207: Each of the switching IBS-Nr1s selects one channel from the alternative channel list of the switching IBS-Nr1 as the target channel T and switches to the target channel T. After this, the IBS occupies the working channel S.

Step 208: The IBS broadcasts a channel occupying message to all the IBS-Nr1s so as to instruct each of the IBS-Nr1s to update the channel information, and each of the IBS-Nr1s updates the CUT of the IBS-Nr1 accordingly.

Step 209: Each of the switching IBS-Nr1s broadcasts a channel switch message to all neighbor BSs of the switching IBS-Nr1, i.e. the second neighbor BSs (IBS-Nr2s) excluding the IBS, to instruct all the IBS-Nr2s to update their own CUTs.

Step 210: Each of the IBS-Nr2s updates the CUT of the IBS-Nr2, and the process ends.

In practice, an operating BS (OBS) may exit from the network. The exiting OBS may be an IBS that has been in normal work or any BS in the network. Thus, the OBS is required to broadcast a channel exit message to all neighbor BSs of the OBS, in other words, the fourth neighbor BSs (IBS-Nr4s), before exiting. Each of the IBS-Nr4s updates the CUT of the IBS-Nr4 according to the channel exit message, including deleting the channel information of the OBS and judging whether to add the working channel of the OBS into the alternative channel list of the IBS-Nr4, so that each of the BSs in the network can acquire the actual usage of the channel in time.

Figure 3:
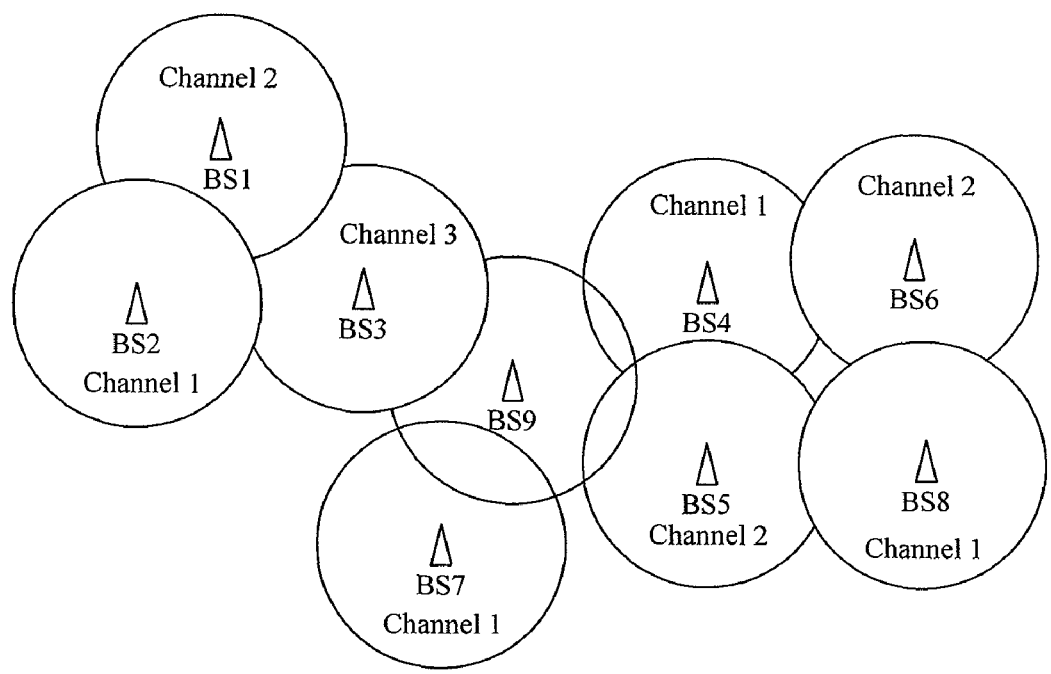
FIG. 3 shows a network architecture before channel re-allocation according to another embodiment of the present invention.

FIG. 3 shows an example of a network topology to explain the embodiment of the present invention. In FIG. 3, BS1 to BS8 are all OBSs, and any two intersecting BSs are both the neighbor BSs to each other. For example, BS1 and BS2 are neighbor BSs to each other. Interference may occur between each other if the neighbor BSs occupy the same channel simultaneously. Thereby, the neighbor BSs need to work on different channels. Assume that only three channels are available in the current area and respectively are Channel 1, Channel 2, and Channel 3, and the distribution of the three channels at the eight BSs (BS1 to BS8) is shown in FIG. 3.

As shown in FIG. 3, an IBS BS9 starts in the current area. Four neighbor BSs, i.e. BS3, BS4, BS5, and BS7 can be knowledge by BS9, and channels that may be available to BS9 are Channel 1, Channel 2 and Channel 3. Because the working channel of BS3 is Channel 3, the working channels of BS4 and BS7 are Channel 1, and the working channel of BS5 is Channel 2, BS9 can not scan any free channel. In order to avoid interference between BS9 and all the neighbor BSs of the BS9, the channels shall be provided for BS9, or BS9 is made to share a channel with a neighbor BS at different time.

Table 2 is a CUT of the BS9 before the working channel S of the BS9 is selected. According to the table, among the four neighbor BSs of BS9, BS3 occupies Channel 3 solely and can not switch the working channel of the BS3 to another channel. BS5 occupies Channel 2 solely, but can switch the working channel of the BS5 to Channel 3 without any interference generated. BS4 and BS7 occupy Channel 1 simultaneously, and both have their own alternative channels.

TABLE 2

| BSID | Working Channel | Alternative Channel List |
|---|---|---|
| BS9 | — | — |
| BS3 | 3 | Null |

TABLE 2-continued

| BSID | Working Channel | Alternative Channel List |
|---|---|---|
| BS4 | 1 | 3 |
| BS5 | 2 | 3 |
| BS7 | 1 | 2, 3 |

Figure 4:
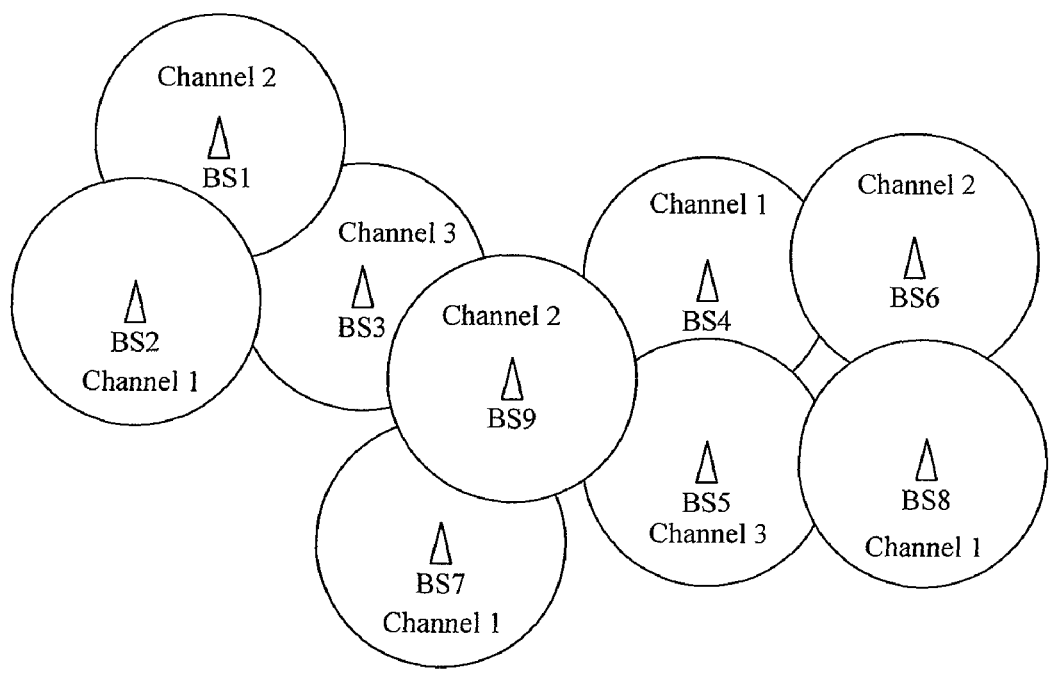
FIG. 4 shows a network architecture after channel re-allocation according to another embodiment of the present invention.

Therefore, BS5 may switch the working channel of the BS5 from Channel 2 to Channel 3 firstly, and then Channel 2 is determined as the working channel S of BS9. After the above channel negotiation process, the channel distribution in the current area is shown in FIG. 4. In other words, one channel is left for BS9 through the channel switch of the neighbor BSs.

According to the method of the present invention, when the number of the channels in the network is small, the channels of the neighbor BSs can be switched to improve the capability of the system to accommodate more BSs. Furthermore, the number of the BSs that can be accommodated if the channel switch is equal to the number of the BSs that can be accommodated after all the BSs are switched. Compared with the method of adjusting the channels of all the BSs, the method provided by the present invention only makes adjustments between the neighbor BSs, so the channel negotiation has a higher efficiency.

Seen from the above embodiments, through the method and system of channel negotiation between neighbor BSs provided by the present invention, the channels between neighbor BSs are adjusted through negotiating automatically, and resource distribution for the whole network is optimized. The above process is dynamic, and reduces the maintenance cost. The channel adjustment is performed only between neighbor BSs, which improves the negotiation efficiency between the BSs greatly.

Though illustration and description of the present disclosure have been given with reference to preferred embodiments thereof, it should be appreciated by persons of ordinary skill in the art that various changes in forms and details can be made without deviation from the spirit and scope of this disclosure, which are defined by the appended claims.

What is claimed is:

1. A method of channel negotiation between neighbor base stations (BSs), comprising:
   obtaining, by a first BS, channel information of all second BSs which are neighbor BSs of the first BS in response to the first BS starts;
   selecting, by the first BS, a channel in a network as a first working channel of the first BS;
   negotiating, by the first BS, with all third BSs to switch channel, wherein the third BSs refer to BSs which occupy the first working channel in all the second BSs; and
   occupying, by the first BS, the first working channel if all the third BSs have switched a working channel of the third BS to a target channel, wherein the target channel is a channel excluding the first working channel; and
   instructing, by the first BS, the third BSs that have switched to switch back to the original working channel and selecting, by the first BS, another channel excluding the first working channel in the network to re-perform negotiation with all the third BSs if at least one of the third BSs fails to switch the working channel of the third BS to a target channel.

2. The method according to claim 1, wherein the obtaining, by a first BS, channel information of all second BSs comprises:
   obtaining, by the first BS, the channel information of the second BS by sending a channel query message to each of the second BSs, or
   broadcasting, by each of the second BSs, the channel information of the second BS to the first BS in response to acquiring that the first BS starts through scanning.

3. The method according to claim 1, wherein the selecting a first working channel of the first BS comprises:
   determining number of the second BSs occupying a channel as the working channel of the second BS and whether each of the second BSs occupying the channel as the working channel of the second BS has at least one alternative channel; and
   determining the channel as the first working channel if each of the second BSs occupying the channel as the working channel of the second BS has at least one alternative channel and the number of the second BSs occupying the channel as the working channel of the second BS is minimum.

4. The method according to claim 1, further comprising:
   broadcasting, by the first BS, a channel occupying message to all the second BSs in response to receiving the switch response messages from all the third BSs; and
   updating, by each of the second BSs, a channel usage table (CUT) according to the channel occupying message.

5. The method according to claim 4, wherein the updating, by each of the second BSs, a channel usage table (CUT) comprises:
   deleting, by the second BS, the first working channel from the alternative channel list of the second BS, and recording channel information of the first BS in the CUT; and
   deleting, by the second BS, the target channel from the alternative channel list of the second BS if the second BS is a third BS.

6. The method according to claim 1, further comprising:
   broadcasting, by each of the third BSs, a channel switch message to all fourth BSs neighboring to the third BS; and
   updating, by each of the fourth BSs, the CUT of the fourth BS according to the channel switch message.

7. The method according to claim 6, wherein the updating, by each of the fourth BSs, the CUT comprises:
   deleting, by the fourth BS, the target channel from the alternative channel list of the fourth BS, and setting the target channel as the working channel of the third BS in the CUT;
   judging whether the first working channel is occupied by at least one fifth BS neighboring to the fourth BS; and
   adding, by the fourth BS, the first working channel to the alternative channel list of the fourth BS if the first working channel is not occupied.

8. The method according to claim 1, further comprising:
   broadcasting, by a sixth BS, a channel exiting message to all seventh BSs neighboring to the sixth BS before exiting the network; and
   updating, by each of the seventh BSs, the CUT of the seventh BS according to the channel exiting message.

9. The method according to claim 8, wherein the sixth BS is the first BS working normally or any BS working normally in the network.

10. The method according to claim 4, wherein the CUT comprises at least one item of information below: the working channel and the alternative channel of a BS, and the working channels and the alternative channels of all the BSs neighboring to the BS.

11. The method according to claim 6, wherein the CUT comprises at least one item of information below: the working channel and the alternative channel of a BS, and the working channels and the alternative channels of all the BSs neighboring to the BS.

12. The method according to claim 8, wherein the CUT comprises at least one item of information below: the working channel and the alternative channel of a BS, and the working channels and the alternative channels of all the BSs neighboring to the BS.

13. A system of channel negotiation between neighbor base stations (BSs), comprising a first BS and at least one second BS neighboring to the first BS, wherein:
   the first BS is adapted to obtain channel information of all the second BSs which are the neighbor BSs of the first BS, select a channel in the network as the first working channel of the first BS when starting, request all third BSs to switch channel, and occupy the first working channel after all the third BSs have switched a working channel of the third BS to a target channel; and
   each of the third BSs is adapted to switch to the target channel in response to determining another channel as the target channel of the third BS, wherein the third BSs refer to BSs which occupy the first working channel in all the second BSs;
   wherein:
   the first BS is further adapted to send a channel switch request to all the third BSs; and
   each of the third BSs is further adapted to judge whether the third BS has at least one alternative channel; the third BS returns a switch fault report to the first BS if the third BS does not have at least one alternative channel; the third BS selects a channel from the alternative channel list of the third BS as a target channel of the third BS and returns a switch response message to the first BS if the third BS has at least one alternative channel.

14. The system according to claim 13, wherein:
   the first BS is further adapted to send a channel switch request to all the third BSs; and
   each of the third BSs is further adapted to judge whether the target channel designated in the channel switch request is the alternative channel of the third BS; the third BS returns a switch fault report to the first BS if the target channel is not the alternative channel of the third channel; the third BS returns a switch response message to the first BS if the target channel is the alternative channel of the third channel.

15. The system according to claim 13, wherein:
   the first BS is further adapted to broadcast a channel occupying message to all the second BSs; and
   each of the second BSs is further adapted to update a channel usage table (CUT) of the second BS according to the channel occupying message.

16. The system according to claim 15, wherein:
   each of the third BSs is further adapted to broadcast a channel switch message to all fourth BSs neighboring to the third BS; and
   each of the fourth BSs is further adapted to update the CUT of the fourth BS according to the channel switch message.

17. The system according to claim 13, wherein:
   the first BS is further adapted to broadcast a channel exiting message to all the second BSs before exiting the network; and each of the second BSs is further adapted to update the CUT of the second BS according to the channel exiting message.

18. A base station of channel negotiation between neighbor base stations (BSs), wherein the base station is configured to
- obtain channel information of all second BSs which are neighbor BSs of the first BS in response to the first BS starts;
- select a channel in a network as a first working channel of the first BS;
- negotiate with all third BSs to switch channel, wherein the third BSs refer to BSs which occupy the first working channel in all the second BSs; and
- occupy the first working channel if all the third BSs have switched a working channel of the third BS to a target channel, wherein the target channel is a channel excluding the first working channel; and instruct the third BSs that have switched to switch back to the original working channel and select another channel excluding the first working channel in the network to re-perform negotiation with all the third BSs if at least one of the third BSs fails to switch the working channel of the third BS to a target channel.

* * * * *